E. G. KITZ.
TOY VEHICLE.
APPLICATION FILED JUNE 20, 1919.

1,323,068.

Patented Nov. 25, 1919.

Inventor:
Edward G. Kitz

UNITED STATES PATENT OFFICE.

EDWARD G. KITZ, OF OSHKOSH, WISCONSIN.

TOY VEHICLE.

1,323,068.  Specification of Letters Patent.  Patented Nov. 25, 1919.

Application filed June 20, 1919. Serial No. 305,546.

*To all whom it may concern:*

Be it known that I, EDWARD G. KITZ, a citizen of the United States, and resident of Oshkosh, in the county of Winnebago and State of Wisconsin, have invented certain new and useful Improvements in Toy Vehicles; and I do hereby declare that the following is a full, clear, and exact description thereof.

My invention relates to new and useful improvements in toy vehicles, more particularly of that type whereon a child may sit and propel the vehicle by striking its feet against the ground.

It is in general the object of my invention to simplify and otherwise improve the structure of toy vehicles of this character and it is more particularly my object to provide a vehicle which, in an exceedingly economical structure, roughly simulates an automobile in appearance, whereby to increase the attractive nature of the toy.

It is a further object of my invention to provide a most economical steering arrangement for the front wheels of the vehicle which is operable by an obliquely inclined steering column, as in a real automobile.

A still further object resides in the provision of a body for the toy vehicle which may be formed of board sections with a minimum amount of shaping to present an attractive simulation of an automobile roadster body.

With the above and other objects and advantages in view, my invention resides in the novel combinations, formation and arrangement of parts hereinafter more fully described and particularly pointed out in the appended claims.

In the accompanying drawings.

Figure 1:
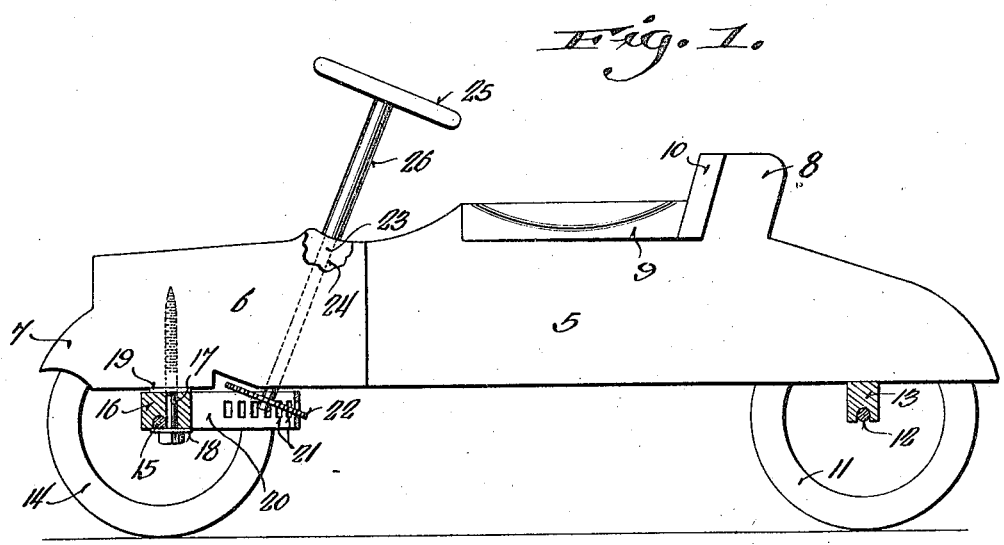
Figure 1 is a view, partly in side elevation and partly in section, of a toy vehicle embodying my invention.
Figure 2:
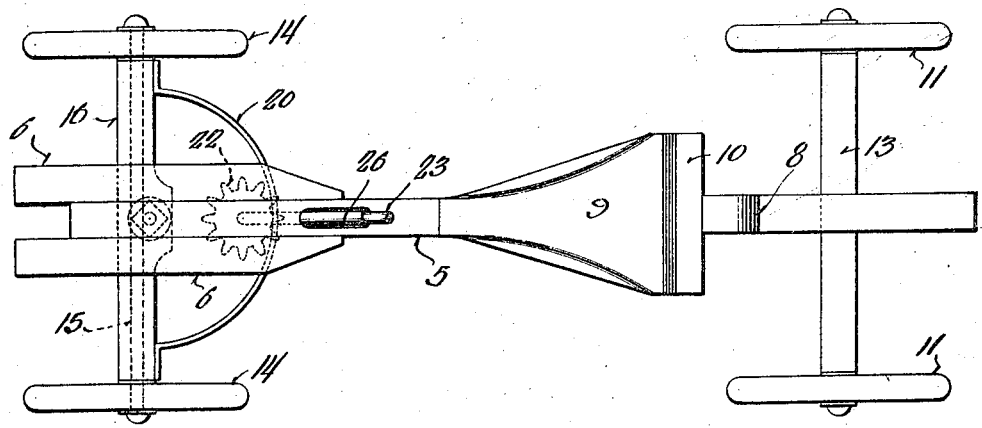
Fig. 2 is a plan view of the vehicle with the steering wheel removed.

Referring now more particularly to the drawings, the body of my improved toy vehicle is formed of an elongated plank or board 5 which has its rear end portion taperingly reduced to correspond to the elevational contour of the rear portion of a roadster type of an automobile body, the board being disposed vertically on edge and having its forward portion shaped to correspond to the elevational contour of an automobile hood, a pair of side boards 6 being secured to the forward portion of the body board 5 and corresponding in shape to said forward portion whereby to further carry out the simulation of an automobile hood and whereby to strengthen the forward portion of the body board in certain apertures performed therein, the forward ends of the side boards 6 being provided with reduced windshield simulating extensions 7. The intermediate upper portion of the body board is cut away and is provided rearwardly of its cut-away section with an upstanding seat back projection 8. The horizontal seat board 9 is secured in the cut-away section of the body board, said seat board being taperingly increased in width toward the rear end and the rear end of the seat board abuts a back board 10 which is inclined obliquely upward and rests against the seat back extension 8 of the body board.

An exceedingly simple body structure is thus provided which is durable in use and which simulates an automobile body with sufficient closeness to render it attractive to the average child.

The rear portion of the body is supported by rear wheels 11 carried on a metallic axle 12 which is secured in the longitudinal curved lower portion of a wooden axle bar 13 secured transversely under the rear portion of the body board.

A pair of front wheels 14 mounted on a metallic axle 15 are disposed in the longitudinal curved lower portion of a wooden axle bar 16 and this axle bar is pivotally mounted under the forward portion of the body by an elongated wood screw 17 passed through said axle bar 16 and threaded into the body board 5, the lower end of said screw carrying a washer 18 which rests against the head of the screw and which engages the metallic axle 15 to hold it in the channel of the axle bar 16. A washer 19 is disposed on the screw shank between the bar 16 and the body of the vehicle, and it is noted in this connection that the side boards 6 of the body afford a desirable additional bearing width. For steering this front wheel structure, an arcuate rack plate 20 is provided, having its extremities outturned and secured to the axle bar 16, the curvature of said plate being concentric to the screw 17. Said plate is provided with a series of vertically elongated tooth slots 21 in which are engageable teeth of a gear wheel 22 carried on the lower end of a steering shaft 23 which is journaled in an oblique passage 24 extending entirely through the body board 5, the steering shaft being thus afforded its usual rearward inclination by reason of the oblique extension of the passage 24, and it is noted that, particularly by reason of the vertical elongation of the tooth slots 21 of the rack plate 20, the gear wheel 22 effects proper mesh therewith despite the fact that it is inclined to correspond to the inclination of the steering shaft, the teeth of the gear wheel having vertical movement in the tooth slots during their rotation in mesh therewith. A steering wheel 25 is secured on the upper end of the shaft, and the shaft is held against vertical displacement by a steering column sleeve 26 disposed thereon and bearing against the upper edge of the body board 5 and against the steering wheel. The simulation of an automobile is thus carried out in the steering mechanism in an exceedingly economical yet efficient manner. It is noted that the passageway 24 of the steering column, and the passage for the axle securing screw 18 would tend to weaken the body board there adjacent, but this weakening is counteracted by the provision of the side boards 6.

While I have shown and described a preferred embodiment of my invention, it will be appreciated that various changes and modifications of structure may be employed to meet differing conditions of use and manufacture without departing in any manner from the spirit of my invention.

What is claimed is:

1. A toy vehicle comprising a single elongated body board disposed vertically on edge and corresponding in elevational contour to the contour of a vehicle, a wheel support for the rear of the body board, a seat board secured on the intermediate portion of the body board, side boards disposed vertically on edge and secured to the sides of the forward end portion of the body board and simulating the hood structure of an automobile, a wheeled front axle member, a pivot member for said front axle member engaged in the forward portion of the body board, and means for steering said front axle member including a steering shaft extended through the body board forwardly of the rear edges of the side boards.

2. A toy vehicle comprising an elongated body board disposed vertically on edge, a wheeled support for the rear portion of the body board, a seat mounted on the intermediate portion of the body board, a wheeled front axle member pivoted under the forward end portion of the body board, an arcuate rack plate secured to said front axle member and disposed concentric to the pivoted axles thereof and provided with a series of vertically elongated tooth slots, a steering shaft extending obliquely through the body board, and a gear wheel on the steering shaft meshing in the tooth slots of the rack bar, said gear wheel being disposed at right angles to the axles of the steering shaft and being consequently inclined with respect to the rack bar whereby its teeth have longitudinal movement in the tooth slots during their rotation in mesh therewith.

3. A toy vehicle comprising an elongated body board disposed vertically on edge, a wheeled support for the rear portion of the body board, a seat mounted on the intermediate portion of the body board, a wheeled front axle member pivoted under the forward end portion of the body board, an arcuate rack plate secured to said front axle member and disposed concentric to the pivoted axles thereof and provided with a series of vertically elongated tooth slots, a steering shaft extending obliquely through the body board, a gear wheel on the steering shaft meshing in the tooth slots of the rack bar, said gear wheel being disposed at right angles to the axles of the steering shaft and being consequently inclined with respect to the rack bar whereby its teeth have longitudinal movement in the tooth slots during their rotation in mesh therewith, a steering wheel on the upper end of the steering shaft, and a steering column sleeve on the upper end portion of the steering shaft and bearing against the said steering wheel and against the upper edge of the body board to hold the steering shaft against downward displacement.

In testimony that I claim the foregoing I have hereunto set my hand at Oshkosh in the county of Winnebago and State of Wisconsin.

EDWARD G. KITZ.